United States Patent [19]
Handa

[11] Patent Number: 5,999,264
[45] Date of Patent: Dec. 7, 1999

[54] ON-THE-FLY OPTICAL INTERFERENCE MEASUREMENT DEVICE, MACHINING DEVICE PROVIDED WITH THE MEASUREMENT DEVICE, AND MACHINE TOOL SUITED TO ON-THE-FLY OPTICAL MEASUREMENT

[75] Inventor: Hirohisa Handa, Ibaraki, Japan

[73] Assignee: Mitutoyo Corporation, Kanagawa, Japan

[21] Appl. No.: 09/103,116

[22] Filed: Jun. 23, 1998

[30] Foreign Application Priority Data

Jun. 26, 1997 [JP] Japan .................................... 9-187763
Jul. 29, 1997 [JP] Japan .................................... 9-219312

[51] Int. Cl.$^6$ ...................................................... G01B 9/02
[52] U.S. Cl. ........................... 356/359; 356/357; 356/345
[58] Field of Search ................................... 356/359, 357, 356/345

[56] References Cited

U.S. PATENT DOCUMENTS 5,433,651  7/1995  Lustig et al. ................................. 451/6
5,649,849  7/1997  Pileri et al. .................................. 451/1
5,724,144  3/1998  Muller et al. ............................. 356/382

OTHER PUBLICATIONS

"Recent Advances in Optical Interference Measurement Methods", Yatagai, Precision Machinery Apr. 1985, pp. 65–72.

"Absolute Measurement of Surface Contours Using Interferometers", Nagahama, Lecture text for 16$^{th}$ Symposium on Optics, 1991, Lecture no. 3, pp. 55–58.

Primary Examiner—Robert H. Kim
Assistant Examiner—Andrew H. Lee
Attorney, Agent, or Firm—Cantor Colburn LLP

[57] ABSTRACT

In a machining device, a workpiece is laid on a working mechanism base and a lapping machine laid on the workpiece is operated to rotate. A lap liquid is supplied between the lapping machine and the workpiece. The lapping machine is provided with a plurality of holes as measurement windows. Above the workpiece, an interferometer is disposed on the opposite side of the lapping machine from the workpiece. The interferometer detects interference fringes on a machined surface of the workpiece through the measurement windows. Based on detection results, the rotation of the lapping machine and the position of the workpiece are controlled.

15 Claims, 13 Drawing Sheets

ON-THE-FLY OPTICAL INTERFERENCE MEASUREMENT DEVICE, MACHINING DEVICE PROVIDED WITH THE MEASUREMENT DEVICE, AND MACHINE TOOL SUITED TO ON-THE-FLY OPTICAL MEASUREMENT

BACKGROUND OF THE INVENTION

1. Field of The Invention

The present invention relates to a measurement device for optically measuring interference fringes of a workpiece, especially to a measurement device in which measuring can be performed during machining. The present invention can be preferably applied to measurements while an abrasive working is being performed in lapping, polishing, or another working method. The present invention also relates to a machining device provided with a measurement device.

2. Description of The Related Art

In order to precisely finish a gauge block or the like, machining such as lapping, polishing, or the like is performed using abrasive particles. A machine tool (lapping tool or the like) as a reference and a workpiece are pressed together, and moved relative to each other. Thereby, the workpiece and the working tool slide against each other. Abrasive particles are then introduced between the workpiece and the machine tool. Such systems employing abrasive particles include both liberated abrasive systems and fixed abrasive systems. In a liberated abrasive system, a liquid in which the abrasive particles is suspended is used, and the liquid is supplied between the machine tool and the workpiece. On the other hand, in the fixed abrasive system, the abrasive grains are embedded in a sliding surface of the machine tool. This method of machining is suitable for precisely finishing surfaces, and is commonly applied, for example, to the machining of gauge blocks or other precision components; the finishing of a lens, mirror, or other optical component; or the precise finishing of a semiconductor wafer or the like.

To measure the accuracy of surface or dimension of an abrasively machined workpiece, a measurement device is commonly used to optically detecting interference fringes. Well known examples of such measurement devices, include Fizeau, and Michelson interferometers or the like, and measurement is usually performed using an image of interference fringes generated in accordance with a profile or contour of the workpiece. However, when the workpiece is set on the abrasive machining device, the workpiece is covered with the working tool, and therefore, on-the-fly measurement cannot be performed during working. Accordingly, the workpiece is set on the measurement device and measuring is then performed after the workpiece is detached from the machining device and cleaned.

Generally in lapping or polishing, a micron, submicron, or even higher work accuracy is required. To obtain such a high accuracy, the workpiece is machined again after it has been cleaned and measured. This labor intensive process of working, cleaning, and measuring must be repeated until a required accuracy is obtained. Therefore, the labor cost of highly accurately machined components, especially of optical components or gauges is very high.

Today, there is a strong demand for high density semiconductor elements. To meet the demand, a method is studied in which an in-process semiconductor wafer is flattened through polishing with liberated abrasives and the wafer is patterned again. It has also been proposed that a displacement meter be incorporated in the machining device. In this method, while changes of surface roughness of a workpiece can be measured during machining. The accuracy of flatness or another profile cannot be measured.

As mentioned above, there has been heretofore known no device in which the profile accuracy of a machined surface can be measured on-the-fly during lapping or polishing. Especially, precise measuring cannot be performed through optical detection of interference fringes. Therefore, the profile must be measured by detaching the workpiece being worked from the machining device each time a measurement is necessary, which inhibits improvements to productivity or work accuracy.

In the above, a problem has been described in the example of abrasive working. However, the problem is not limited to abrasive machining. The interference fringes of the machined surface can also not be optically detected during other types of machining.

SUMMARY OF THE INVENTION

An object of the invention is to provide an interference fringe measurement device which can precisely measure a profile of a workpiece during machining, i.e., on-the-fly. Another object of the invention is to provide a machining device which is provided with such a measurement device and contributes to automation of high precision machining.

(1) To attain these and other objects, one aspect of the present invention provides an in-process optical interference measurement device for optically measuring an interference fringe of a workpiece. The device comprises a machine tool having a measurement window. A measurement light is passed through the measurement window to irradiate a machined of the workpiece being machined. The device also comprises an interferometer for optically detecting the interference fringe through the measurement window from a side of the working tool opposite to the workpiece.

According to the invention, the workpiece can be seen from the interferometer through the measurement window which passes before the interferometer. In a portion in which the workpiece is opposed to the measurement window, the interference fringe can be detected, and profile, flatness or the like, can be measured during machining. Therefore, highly reliable and secure machining can be realized. Furthermore, although the machining device is controlled in a conventional manner, for example, by using a time elapsed after the start of working or the like as a measure, as the present invention allows the profile to be seen while machining, the working can be completed and a required accuracy can be obtained. Moreover, the machining device can be controlled based on measurement results in such a manner that the profile much more closely matches the target profile. As mentioned above, the invention can achieve highly reliable and secure machining, and can further contribute to the automation of high precision machining.

(2) In another aspect of the invention, the in-process optical interference measurement device includes an image generating means for generating an interference fringe image indicating the interference fringe, and an image processing means for obtaining an image in which the interference fringe is continuous in a range broader than the measurement window based on plural interference fringe images when a positional relationship between the working tool and the workpiece differs.

When the positional relationship between the tool and the workpiece differs, a different portion on the workpiece can be seen from the measurement window. Therefore, interference fringes of different portions of the workpiece can be obtained from plural interference fringe images. By performing synthesis processing, equivalent processing, or the like on these images, the interference fringes in a range broader than the measurement window can be obtained. The timing of measurement and the number of images may be properly set to obtain the entire interference fringe of the workpiece.

Preferably, the measurement window is set smaller than the machined surface of the workpiece. Plural measurement windows are disposed separate from one another on the workpiece. In this setting, even when the measurement windows are formed, working capability is not lowered and finishing is not adversely affected, while by synthesizing plural interference fringe images, the interference fringes in the adjoining measurement windows are interconnected. Therefore, an interference fringe image continuous in a broad range can be obtained while maintaining the working performance.

(3) A machining device of the present invention is provided with the aforementioned measurement device. Preferably, the machine tool is disposed on the workpiece. The interferometer performs measuring from above the machine tool. Therefore, the measurement device can be easily disposed in a position to which working liquid is not easily supplied. Furthermore, since the workpiece can be securely supported and the positional relationship between the workpiece and the interferometer is securely maintained, the interference fringes do not deviate from one another among images, even when plural images are photographed in sequence. Therefore, a synthesized image as described above can be effectively obtained.

Moreover, in the present invention, the working liquid may be supplied to the machined surface through the measurement windows. Therefore, a proper amount of liquid can easily be supplied at a proper timing. Preferably, after the work liquid is supplied and a film thickness of work liquid is stabilized, measuring is performed using the interferometer. When the film thickness is not uniform immediately after the work liquid is supplied, measuring is inhibited, and thereby excellent measurement results can be obtained.

(4) The machining device may comprise a drive device for operating at least one of the machine tool and the workpiece. The machine tool, the workpiece, or both may be moved. By relatively moving both the tool and the workpiece, the workpiece is machined. The workpiece or the tool may be rotated or linearly moved. The working drive device is controlled based on the measurement results which are obtained by using the interferometer. The starting or stopping of working, the working speed (relative movement speed), or the like may be controlled.

(5) Preferably, the machining device is constituted in such a manner that a relative arrangement of the workpiece and the machine tool can be changed along a direction orthogonal to a direction in which the relative movement is performed. The arrangement of the workpiece, the tool, or both may be changed. By changing the arrangement, the profile can be positively regulated, and the work accuracy can thus be enhanced.

In such a case, the machining device should be set in such a manner that the profile differs with the relative arrangement. The specifications of the working tool, the operation speed or the like may be set. Alternatively, in the aspect, such a rule as follows may be used.

In a rotary machining device for use in abrasive working or the like, when the workpiece is disposed near the rotation shaft, the center of the machined surface tends to become convex. Conversely, when the workpiece is apart from the rotation shaft, the center of the workpiece tends to become concave.

In consideration of this, in another aspect of the present invention, the convexity/concavity of the machined surface of the workpiece is detected based on the interference fringes which are obtained during machining. Based on the detected results, an offset quantity in arrangement of the workpiece to the rotation center of the working tool is controlled. When the machined surface is concave, the position of the workpiece is moved toward the rotation center and when the machined surface is convex, the workpiece is disposed farther from the tool rotation center. By regulating the flat profile in this manner, the precision of work can be improved.

(6) In some cases, the profile of the workpiece when the workpiece is being machined differs from its profile when it is detached from the machining device after machining. This is often due to properties of the workpiece or specifications of the machining device, differences in temperature during and after machining, pressure exerted during machine, and other factors. In such a case, changes of the profile during and after machining may be obtained beforehand, and machining may be done considering the measured changes.

(7) The invention may be preferably applied to abrasive machining. The invention may be applied to either the liberated abrasive system or the fixed abrasive system. However, the invention can also be applied to any other type of machining.

The workpiece is not especially restricted, and, for example, a gauge like a gauge block, a precision component, a lens, a mirror or another optical component, a semiconductor wafer or the like can be machined.

In the invention, an optional profile, including contour, can be measured by using the interferometer.

The machined surface may be a flat surface or a curved surface resulting from the manufacture of a lens or the like. For example, the profile can be specified in a form of deviation from a sphere.

The machining device may be a type of working only one surface of a workpiece or a type of working opposite or plural surfaces.

Any portion of the workpiece that can be seen through the measurement window can be measured. For example, when the workpiece is a lens glass or another transparent member, interference fringes of a surface opposite to the machined surface may be detected, and a dimension accuracy of the workpiece is obtained through the detection.

By providing opposite surfaces of the workpiece with the work tool having measurement windows and interferometers, the dimension accuracy of the workpiece can be measured. This is effective even when the workpiece is not transparent.

The image of interference fringes may be transmitted to an image display device or printed out via a printer and used for visual measurement. Furthermore, by processing images, flatness or the like may be represented by numeric values.

DETAILED DESCRIPTION OF THE PREFERRED EMBODIMENTS

EMBODIMENT 1

Figure 1:
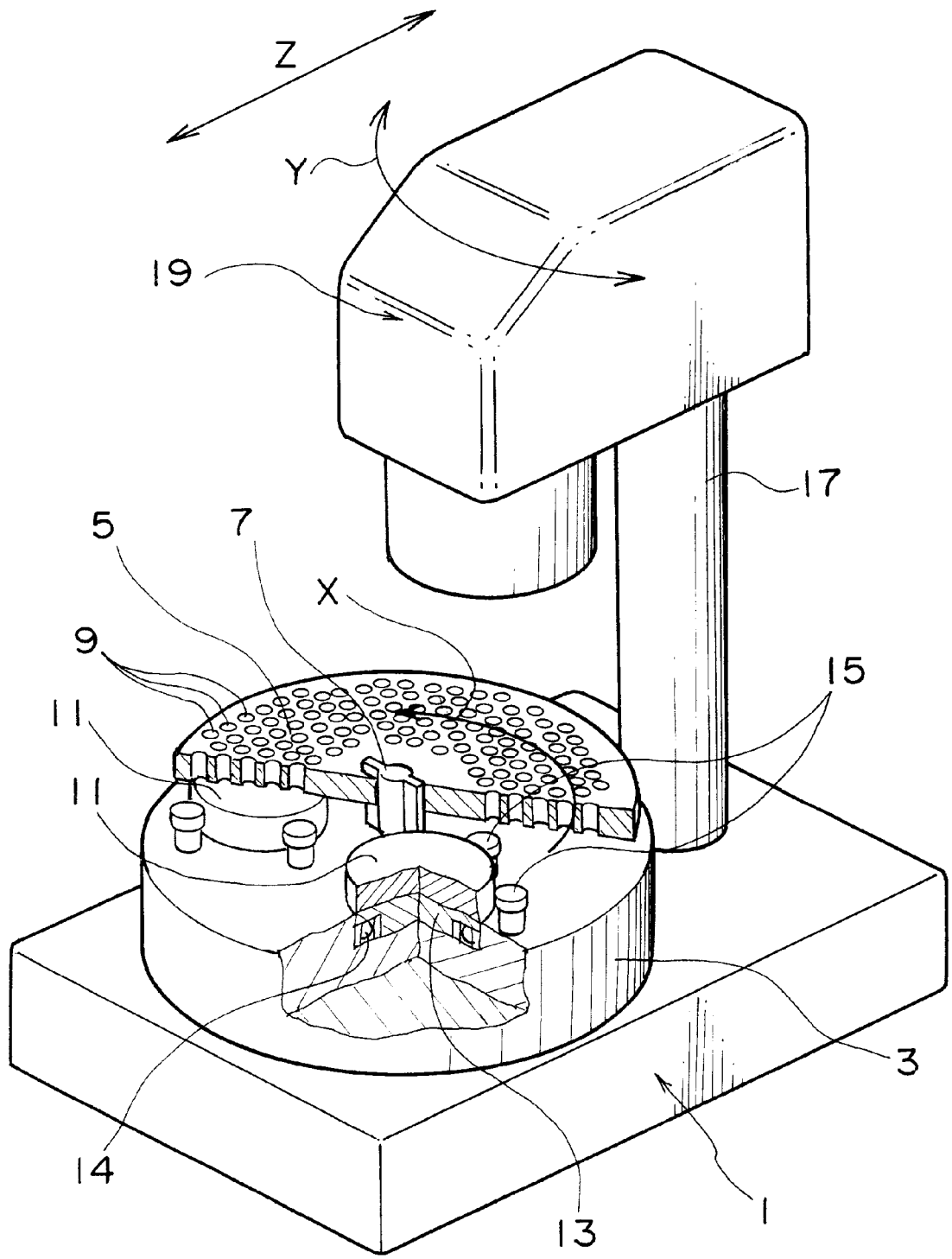
FIG. 1 is a perspective view of a lapping machine provided with a measuring device according to a first embodiment of the invention.

Preferred embodiments of the present invention will be described with reference to the accompanying drawings. In a first embodiment, a measurement device of the invention is applied to an abrasive machining device. FIG. 1 is a perspective view of a lapping machine. To facilitate understanding, the device is partially shown in a sectional view. The lapping machine is different from a general device of a so-called lap master system in that a lapping tool as a machine tool and a workpiece are arranged vertically in reverse. The measurement device of the embodiment is used for measuring the flatness of a machined surface. The machining device of FIG. 1 is integrally provided with the measurement device.

A cylindrical working mechanism base 3 is mounted on a device base 1. A structure of the working mechanism base 3 is substantially the same as that of a generally used upper-tray type lapping machine. A disc-shaped lapping tool 5 is mounted on top of the working mechanism base 3, and a rotation shaft 7 is fixed to the center of the lapping tool 5. The rotation shaft 7 is inserted in a vertical hole formed in the center of the working mechanism base 3, and rotatably supported by a bearing (not shown) relative to the working mechanism base 3. A motor is provided in the working mechanism base 3 and the rotation shaft 7 is rotatably operated by the motor in a counterclockwise direction (arrow X). The back surface (reference work surface) of the lapping tool 5 is parallel with the top surface of the working mechanism base 3. The embodiment is characterized in that, as shown in FIG. 1, the lapping tool 5 is provided with multiple measurement windows 9. Each measurement window 9 is a circular opening formed through the lapping tool 5 in a depth direction.

Three disc-shaped workpieces 11 are disposed between the working mechanism base 3 and the lapping tool 5. The workpieces 11 are arranged at equal intervals, i.e., every 120 degrees around the rotation shaft 7 of the lapping tool 5, and are positioned at equal distances from the rotation shaft 7.

Each workpiece 11 is laid on a workpiece base 13 with the same outer diameter. The workpiece base 13 is supported rotatably relative to the working mechanism base 3 by an annular bearing A14 embedded in the working mechanism base 3. Additionally, each workpiece 11 is supported at its side by two bearings B15. The bearings B15 are arranged in such a manner that the workpiece 11 and the workpiece base 13 can be held in a coaxial position. When the workpiece 11 is caused to move together with the rotating lapping tool 5, the movement is inhibited by the bearings B15. In this manner, the workpiece 11 is rotatably supported in a predetermined position on the working mechanism base 3 by the bearings B15. Furthermore, although in this description, the three workpieces 11 are simultaneously machined, the number of workpieces is in no way limited. The workpieces 11 can be freely arranged within a range in which actual machining is not obstructed.

The lapping tool 5 is laid on top of the workpiece 11, and presses against the workpiece 11 by its weight. As required, a working pressure may be applied by placing a weight onto the center of the lapping tool 5. As the lapping tool 5 is rotated in a counterclockwise direction, the workpiece 11 is rotated in the same position on the working mechanism base 3. Relative to the lapping tool 5 as a reference, the workpiece 11 is rotated around the rotation shaft 7 and simultaneously around a center axis of the workpiece 11.

In the present embodiment, a liberated abrasive system is used. While the lapping tool 5 is rotated, a lap liquid as a working liquid is fed by dropping to the lapping tool 5 in a predetermined position by a lap liquid supply device (not shown). The lap liquid supply device automatically supplies a predetermined amount of lap liquid in appropriate cycles. Additionally, a manual lap liquid supply device controlled by an operator may be used. Abrasive particles are mixed in the lap liquid. In this embodiment, since interference fringes are detected via the lap liquid, the abrasive particle size is preferably kept small in order to suppress its influence on measurement. It is preferable to use an abrasive with a particle diameter of 1 $\mu$m or less, and in this embodiment, a diamond abrasive with a particle diameter of 0.25 $\mu$m is used. The lap liquid with the abrasive mixed therein having an appropriate viscosity flows along the measurement windows 9 and enters a boundary face between the lapping tool 5 and the workpieces 11. In this manner, top surfaces of the workpieces 11 are lapped and machined.

A cylindrical support rod 17 is disposed on the device base 1 next to the working mechanism base 3, and an interferometer unit 19 is attached onto the support rod 17. The interferometer unit 19 is extended above the working mechanism base 3, and a tip end of the interferometer unit 19 is positioned above the workpiece 11. An interferometer is contained in the tip end for detecting interference fringes of the workpiece 11 below as an object. For the interferometer, a Fizeau interferometer or another known interferometer may be used. In this embodiment, the interferometer radiates a parallel light beam downward, and the light beam passes through the measurement windows 9 and is reflected by a surface of the lap liquid. Alternatively, the light beam may pass through a film of the lap liquid, reach a machined surface, and be reflected by the machined surface. In the interferometer an image indicative of interference fringes is generated from the reflected light. A detection range of the interferometer is substantially equal to the size of the workpiece 11, and the size of an under opening of the interferometer unit 19 is set in accordance with the detection range. Therefore, the interferometer generates the image of interference fringes in the whole range of one workpiece 11 once.

A measurement light is usually reflected mainly by the surface of the film of the lap liquid, but under some conditions, measurement light passes through the film of the lap liquid to be reflected by the workpiece 11. The reflection phenomenon depends on the material of the workpiece, the type of the lap liquid, or the like. The interference fringes may be obtained from any reflected light, but it is important to obtain the interference fringes indicative of a profile of a machined surface.

The interferometer unit 19 is rotated (arrow Y) relative to the support rod 17 and expanded/contracted in a horizontally longitudinal direction (arrow Z in FIG. 1) by an actuator (not shown). Therefore, the interferometer can move in a two-dimensional direction, and is positioned above the three workpieces 11 so that each workpiece 11 can be measured.

In order to accurately detect interference fringes with the interferometer, a uniform film of lap liquid needs to be formed on the machined surface in a position in which the measurement windows 9 face the workpieces 11. To obtain the uniform film, the number of revolutions of the lapping tool 5 is appropriately controlled. During the working by detecting the interference fringes of the machined surface with the interferometer, flatness can thereby be measured.

Examples of Interference Fringes

An image of interference fringes obtained by using the interferometer will be described with reference to FIGS. 2 to 4. The images in FIGS. 2 to 4 were formed using a CCD camera.

Figure 2:
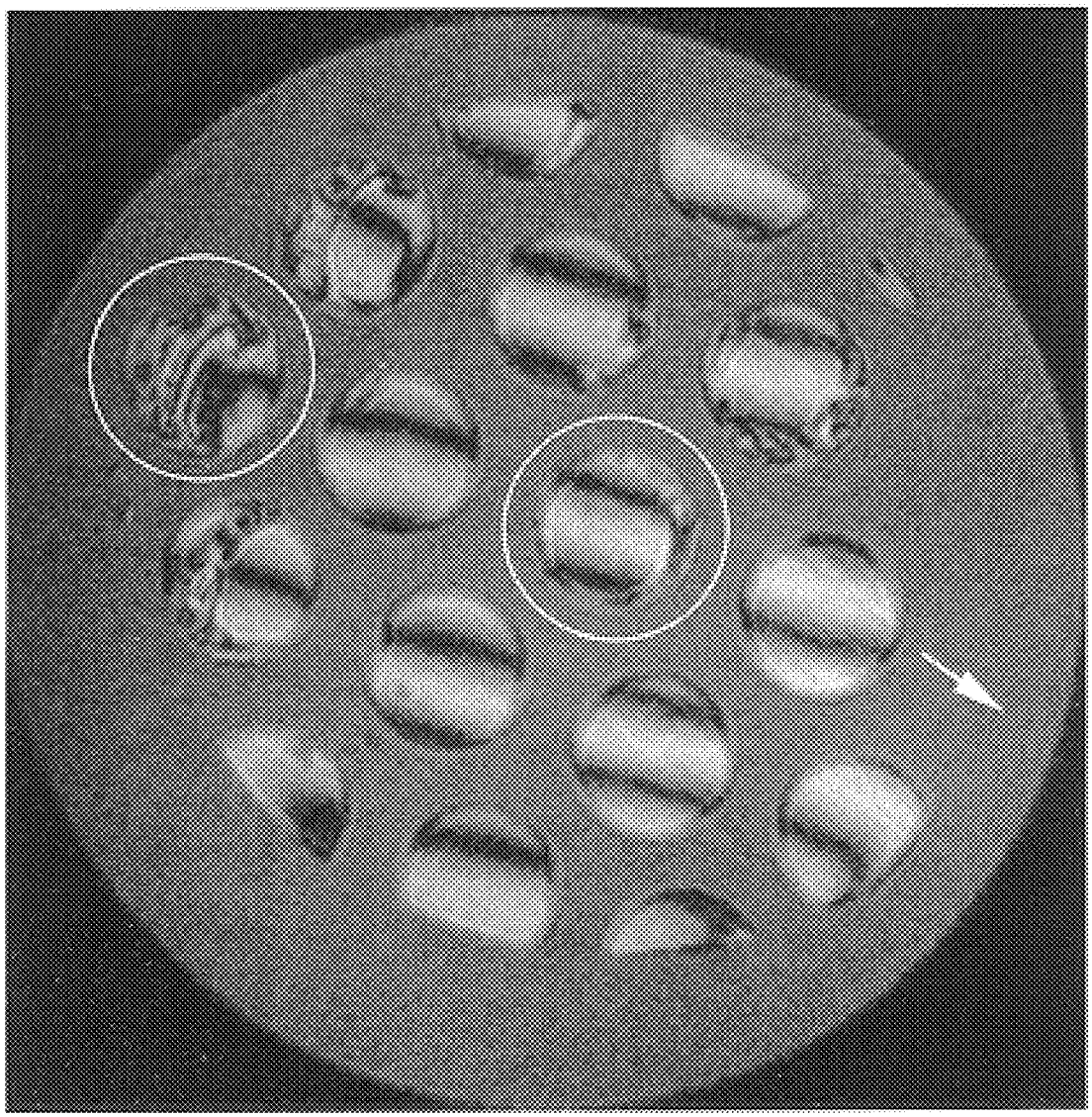
FIG. 2 is a photograph of a half tone image showing an example of an interference image obtained using an interferometer in the machine of FIG. 1.

FIG. 2 was photographed immediately after the lap liquid was dripped onto the lapping tool 5 while the lapping tool 5 was being rotated. Workpiece 11 was a stainless member for gauging, the diameter of the workpiece 11 was about 50 mm, the diameter of each measurement window 9 was 8 mm, and the lapping tool 5 was moving downward to the right (see arrow in FIG. 2) in a region of FIG. 2 at a speed of about 30 mm/sec.

When the image of FIG. 2, was taken the lap liquid had just been supplied, and therefore the film thickness of the lap liquid had not yet stabilized. In a circled window in the central portion of FIG. 2, a slightly excess lap liquid was applied, and surface tension gathered the lap liquid on the periphery of the window, so that the interference fringes were disturbed. In a circled window in the upper right portion of FIG. 2, as the lapping tool 5 moved, an excess lap liquid gathered onto an opposite edge from the movement direction (along and behind the movement direction), and the interference fringes were also disturbed. However, in another portion a proper amount of lap liquid was applied, the lap liquid was spread thinly on the surface of the workpiece 11, a uniform liquid film was formed, and an excellent interference image was obtained. After a proper time elapsed from the supply of the lap liquid, the film thickness was made entirely uniform. Therefore, an actual measurement may be performed after a certain time elapses.

Figure 3:
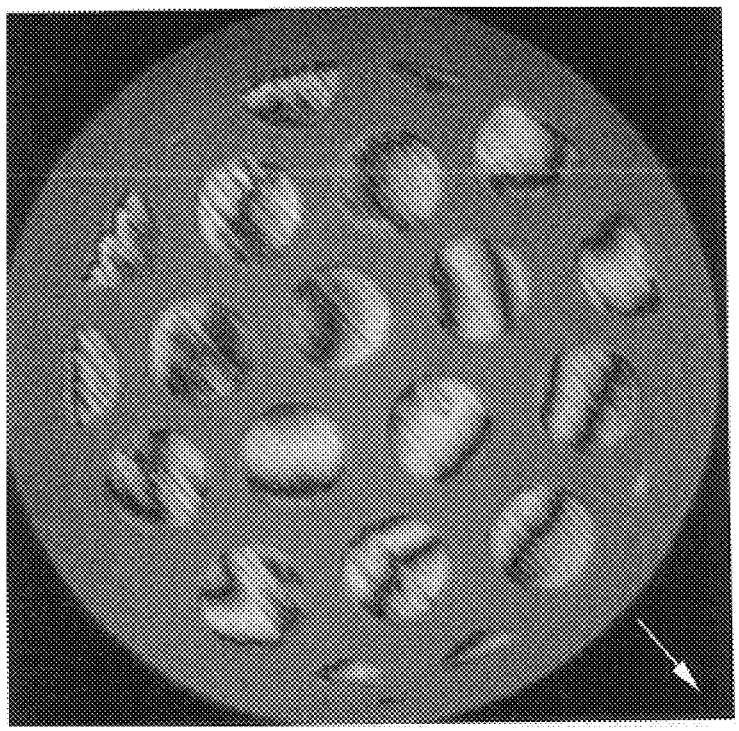
FIG. 3 is a photograph of a half tone image showing an example interference image obtained using the interferometer in the machine of FIG. 1.

FIG. 3 shows an image of interference fringes photographed under preferable conditions. The lapping tool 5 was rotated and operated at a proper rotation speed in such a manner that the film thickness of the lap liquid became uniform. After the lap liquid was supplied and the film thickness was stabilized, the image was photographed. FIG. 3 shows the image photographed after machining was begun. FIG. 4 shows a comparative image of the interference fringes of the same workpiece as in FIG. 3. The interference fringes of FIG. 4 were obtained before machining using another conventional interferometer.

Figure 4:
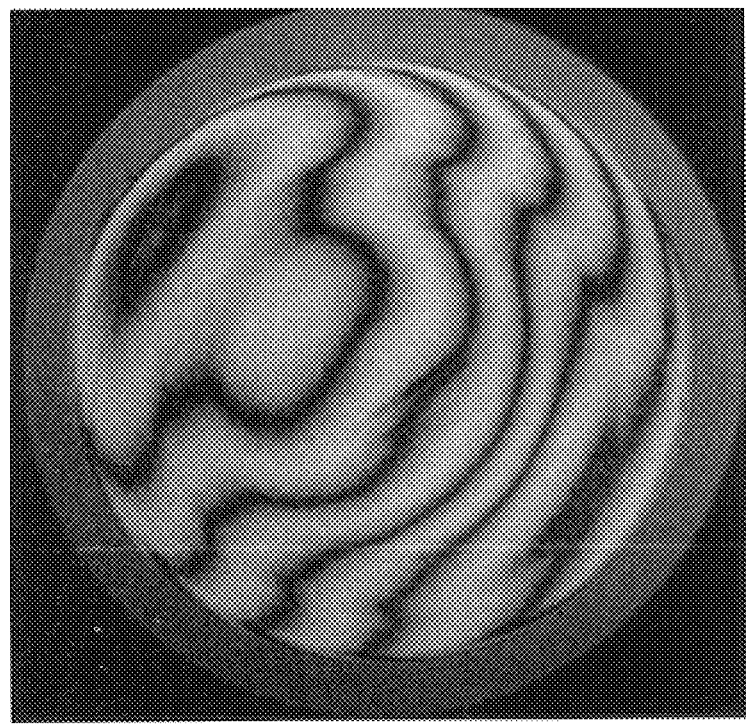
FIG. 4 is a photograph of a half tone image showing an example interference image obtained using a workpiece before worked for comparison with FIG. 3.

As a result of comparison between FIGS. 3 and 4, it is understood that the entire configurations of the interference fringes are remarkably similar to each other. Therefore, it is seen that the measurement device of the invention can measure the profile of the machined surface during machining with a sufficient accuracy.

An example of application of the image in FIG. 3 will be described. The interference image is displayed, for example, on a display equipped with the machining device. An operator visually judges flatness by the display. When the operator judges that the flatness reaches a required value, the machining device is stopped and the workpiece 11 is taken out. Therefore, in order to confirm whether or not the required accuracy is obtained, it is not necessary to remove the workpiece 11 from the machine or otherwise interrupt machining.

In this method, the image of FIG. 3 is used as is. In the image of FIG. 3, areas other than the measurement windows, i.e., the area in which no interference fringe is seen, is broad. The operator has to estimate the interference fringes in the unseen portion. In this respect, fringe patterns in adjoining windows may be interconnected with proper lines through a proper interpolation process or another image processing.

More preferably, an actual interference image of the entire workpiece 11 may be obtained using the following method.

Synthesis of Interference Fringes

Figure 5A:
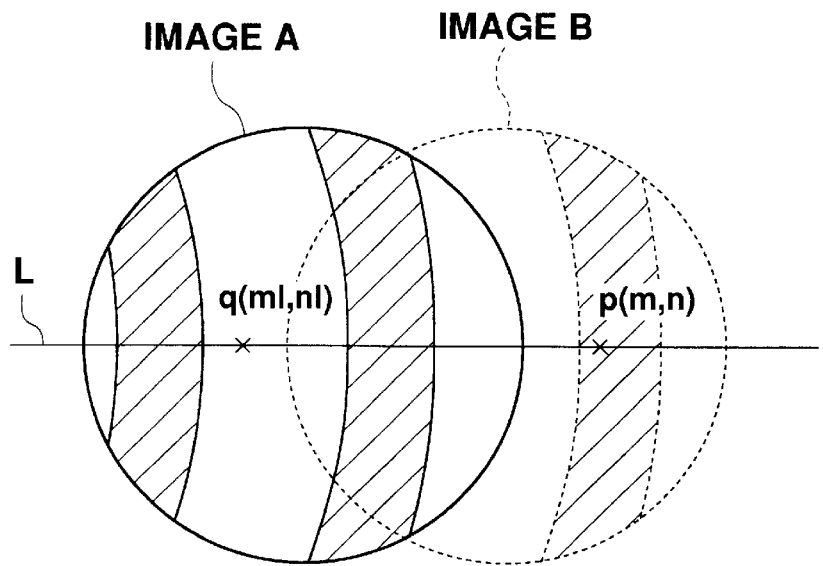
FIGS. 5A and 5B show a process of synthesizing plural interference images for obtaining an interference image of an entire workpiece.

FIG. 5 shows a processing for obtaining the interference image of the entire workpiece. In this processing, by synthesizing plural images, unseen areas obstructed by the lapping tool 5 can be eliminated. FIG. 5A shows an image of interference fringes in one measurement window 9. After an image A is photographed and the lapping tool 5 is rotated slightly, an image B is photographed. The images A and B show the same position of the workpiece 11, but differing positions of the lapping tool 5. Therefore, in the images, the positions of the interference fringes are the same, but different portions of the interference fringes are seen in the measurement window 9. By extracting and synthesizing the measurement window portions (i.e., the portions other than the lapping tool 5) from the two images, an interference image in a broader range can be obtained. By performing the processing of further plural images, the interference image of the entire workpiece can be obtained.

Figure 5B:
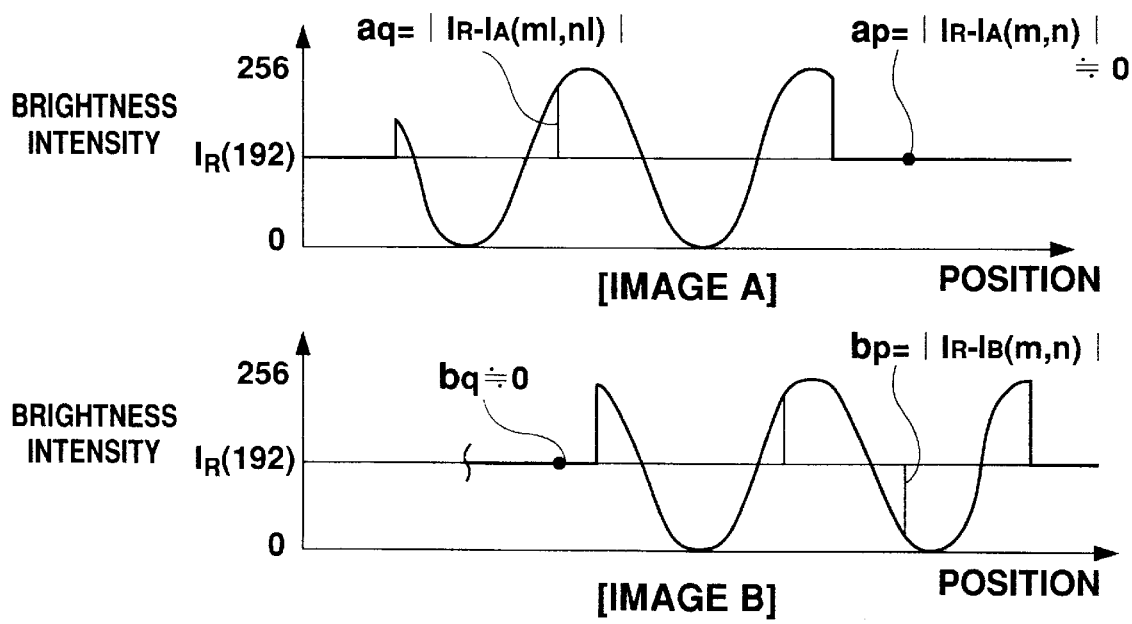

Specifically, in the present embodiment, the following synthesizing process is applied. FIG. 5B shows distributions of brightness intensities of the images A and B along a line L in FIG. 5A. Abscissa axes represent positions on the line L, while ordinate axes represent the brightness intensities. The image A or B has a gradation of 256. The brightness intensities are included in the data of each picture element (pixel).

In FIG. 5B, IR on the ordinate axis represents an average brightness intensity of a lapping tool portion. The surface of the lapping tool is finished in such a manner that any portion thereof is photographed with a substantially constant brightness intensity. Furthermore, to prevent the interference image of the lapping tool 5 from being generated, the surface of the lapping tool is finished to have a proper roughness. A value of IR is set to be about 192 (an intermediate value of the gradation 256) through the material selection and finishing of the lapping tool, the adjustment of the interferometer or the proper preliminary processing of the image. Since the value of IR also slightly changes with optical system noise and performance, measurement is preferably repeated before use to check an appropriate value.

As shown in FIG. 5B, in both images A and B, where there is no lapping tool, the brightness intensity periodically changes in accordance with the brightness of the interference fringes. Where the lapping tool is present, the brightness intensity substantially becomes constant.

Here, the image A is used as a base, and the image B is added to the image A. A picture element p(m,n) which has the same position in both the images A and B is noted (m and n represent coordinates in the image). Luminous intensities of the picture element p(m,n) in the images A and B are set to IA(m,n) and IB(m,n), respectively. Absolute values ap and bp of differences of the intensities IA(m,n) and IB(m,n) from IR are obtained using the following formulas:

$$ap=|IR-IA(m,n)|$$

$$bp=|IR-IB(m,n)|$$

When ap<bp, the brightness intensity of the picture element p in the data of the image A is replaced with the brightness intensity of the picture element p in the data of the image B. When ap≧bp, the data of the picture element p in the image A is used as is without being replaced.

When the picture element p is in the position shown in FIG. 5A, in the image A the picture element p resides in the lapping tool portion, and ap is substantially zero. In the image B the picture element p is in a dark portion of the interference fringe. Since bp is larger than ap, IA(m,n) is replaced with IB(m,n). On the other hand, for a picture element q(m1,n1), in the image A the picture element q is in a bright portion of the interference fringe, while in the image B the picture element p is in the lapping tool portion, and bq is substantially zero. Therefore, IA(m1,n1) is used as is without being replaced with IB(m1,n1).

Figure 6:
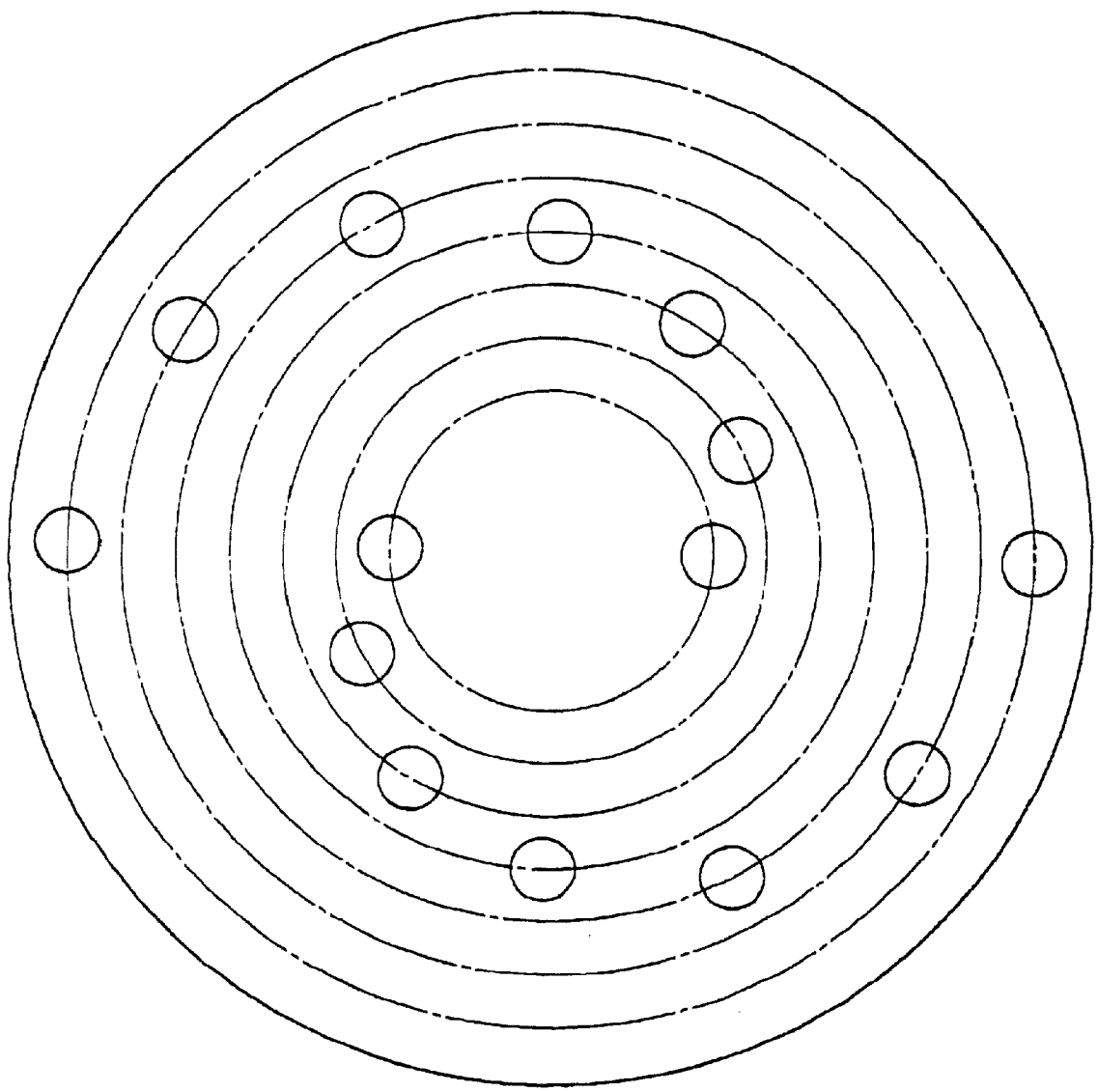
FIG. 6 is a plan view of a lapping tool showing an example of arrangement of measurement windows necessary for obtaining the interference image of the entire workpiece through the synthesizing process when the number of windows is reduced.

The same processing is performed on the entire image. In FIG. 5A, a crescent-shaped interference image portion is represented only in the image B. The crescent-shaped portion is added to the image A as a result of the aforementioned processing. By further using plural images C, D . . . , the same processing is performed like A+C, A+D . . . . Thereby, an interference image of a broader range is applied to the image A. In this manner, an interference image covering the entire workpiece 11 can be obtained. In principle, for example, when the measurement windows are arranged as shown in FIG. 6, the interference image of the entire workpiece can be obtained even if any size of workpiece is disposed in any position. Additionally, the brightness intensity of each picture element is processed here, but even when another data indicative of the interference fringe (e.g., color value or luminance value) is processed, the processing can be performed in the same manner.

Figure 7:
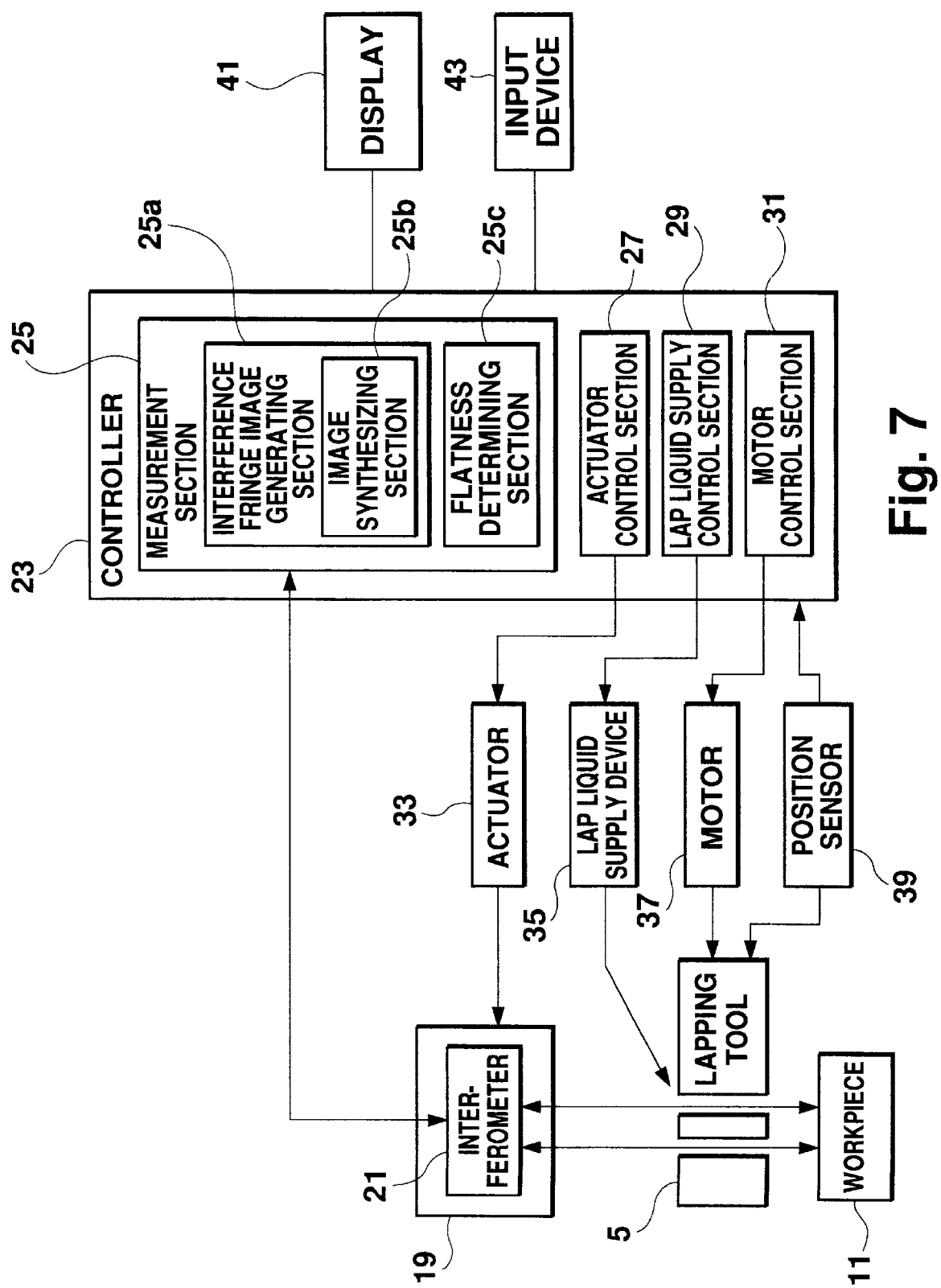
FIG. 7 is a block diagram showing an entire constitution of the lapping machine of FIG. 1.

Automatic Working (FIG. 7)

Automatic machining using the machine according to the present embodiment will next be described. FIG. 7 is a block diagram showing an entire constitution of a lapping machine. As described previously, the lapping tool 5 is placed on the workpiece 11, and an interferometer 21 is disposed in the interferometer unit 19 above the lapping tool 5. The interferometer 21 comprises a camera device, and an image formed by photographing interference fringes is transmitted to a controller 23. The controller 23 is provided with a measurement section 25, an actuator control section 27, a lap liquid supply control section 29 and a motor control section 31.

In the measurement section 25, an interference fringe image generating section 25a generates digital data of the interference fringe image based on the output from the interferometer 21. The image generating section 25a includes an image synthesizing section 25b for synthesizing the images as described with reference to FIG. 5. The measurement section 25 controls the interferometer 21 to obtain plural interference images when the angular position of the lapping tool 5 slightly differs. Subsequently, through the aforementioned image synthesizing, the image indicating the interference fringes continuously extended over the entire workpiece is generated from the plural interference images. A flatness determining section 25c uses the synthesized image to determine a flatness of a machined surface. Methods of obtaining the flatness from the interference fringe image are well known, and are not described here.

The actuator control section 27 controls an actuator 33, which, rotates the interferometer unit 19 relative to the support rod 17 and expands/contracts the interferometer unit 19. Thereby, the interferometer 21 is moved to a position above each of the three workpieces 11. The lap liquid supply control section 29 controls a lap liquid supply device 35 to regulate the lap liquid supply position, time, and amount. As previously described, the lap liquid supply device 35 drops the lap liquid onto the lapping tool 5. The motor control section 31 controls a motor 37 for rotating the lapping tool 5 to rotate or stop, and regulates the rotation speed of the motor 37.

The controller 23 is further connected to a position sensor 39 for detecting the position of the lapping tool 5 in its height direction. The movement quantity of the lapping tool 5, the thickness of the workpiece 11, and the cut quantity through the lap working are obtained based on an output from the position sensor 39.

The controller 23 is also connected to a display 41 as an output device and a keyboard or another input device 43. The image generated by the interference image generating section 25a is displayed on the display 41. With the input device 43, an operator enters instructions, for example, to operate or stop the device. An image plane necessary for the operator to operate is also displayed on the display 41 at an appropriate time.

Operation of the device shown in FIG. 7 will be described. When machining begins, the motor control section 31 rotates the motor 37. The lapping tool 5 begins rotating, and the workpiece 11 is rotated relative to the lapping tool 5. The lap liquid supply control section 29 simultaneously controls the lap liquid supply device 35 to supply the lap liquid, which passes through the measurement windows 9 to enter a clearance between the lapping tool 5 and the workpiece 11. Lapping is performed in this manner.

The actuator control section 27 controls the actuator 33 to sequentially move the interferometer 21 to positions above the three workpieces 11. Above each workpiece 11, the interferometer 21 follows an instruction of the measurement section 25 to detect an image of interference fringe of the workpiece 11, photograph the image with the camera device, and transmit the image to the controller 23. The actuator 33 and the interferometer 21 repeat the operation in predetermined cycles.

The lap liquid supply control section 29 controls the lap liquid supply device 35 to supply the lap liquid at predetermined intervals. No interference fringe is detected until a predetermined time elapses after the lap liquid is supplied because it is difficult to accurately judge the flatness (deviation from flatness) when the lap liquid is not uniform, as can be seen from FIG. 2. In the processing, for example, the interferometer 21 is inhibited from photographing the image or the measurement section 25 is inhibited from processing the data.

Based on the output from the interferometer 21, the measurement section 25 calculates the flatness of the machined surface of the workpiece 11 being machined. Each time flatness is observed, it is judged whether or not the flatness has reached a required value. The controller 23 judges from the output of the position sensor 39 whether or not the thickness of the workpiece 11 reaches a target work value. When it is judged that the thickness and the flatness of the workpiece 11 reach their target values, the motor control section 31 stops the motor 37.

As described, in this embodiment, the flatness or profile of the workpiece can be obtained during lapping. Once the required accuracy is obtained, the motor can be stopped to complete the lapping. Therefore, highly accurate automatic machining can be performed based on the measurement results.

Furthermore, in the machining device of this embodiment, the workpiece 11 rotates itself as the lapping tool 5 is rotated, and no positive rotating force is applied to the workpiece 11. On the other hand, the device of this embodiment can be naturally applied in the same manner to a machining device in which the workpiece 11 is allowed to rotate at a predetermined number of rotations by a planetary gear mechanism or the like.

EMBODIMENT 2

In the first embodiment, unlike common abrasive machining device, the workpieces are arranged under the lapping tool. Thereby, the arrangement of the interferometer or the like is facilitated, and the invention is easily realized. In a second embodiment, the invention is applied to a general abrasive machining device, i.e., a machining device in which the workpieces are arranged on top of the lapping tool. Since the second embodiment is the same as the first embodiment in its entire constitution and principle, the description will emphasize features differ from those of the first embodiment.

Figure 8:
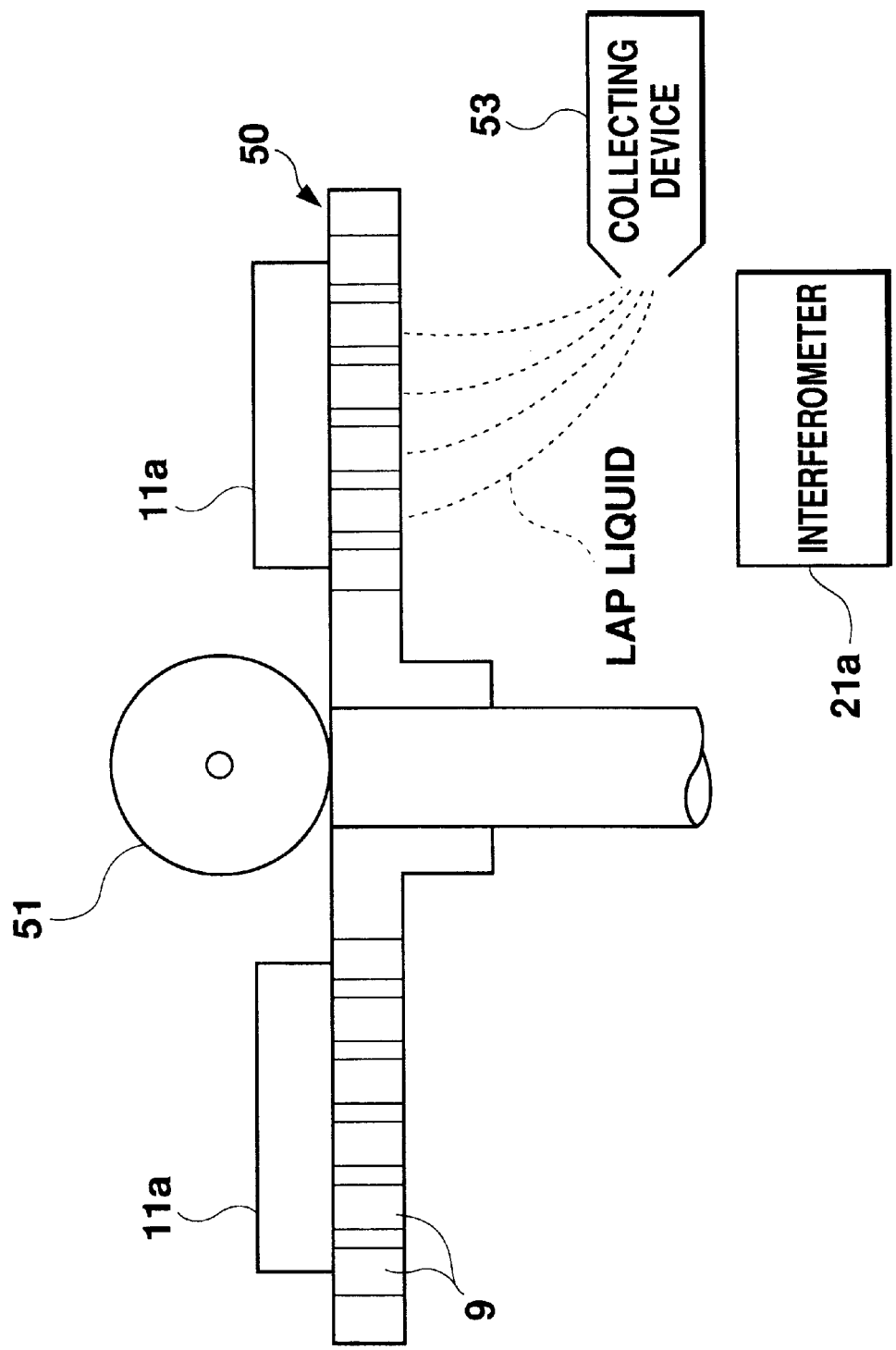
FIG. 8 is a sectional view showing a constitution of a lapping machine according to a second embodiment of the present invention.

FIG. 8 partially shows a lapping tool 5a in the machining device according to the second embodiment. The lapping tool 5a is disposed with a reference work surface (surface for grinding workpieces) facing upward. The lapping tool 5a is rotated and operated by a motor (not shown). In the second embodiment, the lapping tool 5a does not move vertically. Workpieces 11a are laid on the lapping tool 5a with the surfaces to be machined facing downward. The workpieces 11a are rotatably held in the same positions by bearings or another position holding means (not shown) in the same manner as in the first embodiment. To apply additional pressure, weights may be laid on the workpieces 11a.

In the second embodiment, an interferometer 21a is disposed below the lapping tool 5a to detect interference fringes of the workpiece 11a positioned above. In the same manner as the first embodiment, the interferometer 21a can be moved along a plane to perform measurement of each workpiece 11a.

In the second embodiment, the lap liquid on the lapping tool 5a flows into the measurement windows 9, turns to a back surface of the lapping tool 5a, and falls. If the lap liquid drips onto the interferometer, measurement results may be adversely affected. To avoid the problem, the following countermeasure is taken.

First, to supply the lap liquid, a roller type lap liquid application device 51 is used. The application device 51 applies the lap liquid to the lapping tool 5a in the same principle as that of an implement for applying a paint or another general agent. A roller of the application device 51 is immersed in the lap liquid. The lap liquid is held in a penetrating condition by the roller. By bringing the roller in contact with the reference surface (top surface) of the lapping tool 5a, a minimum amount of lap liquid necessary for working is applied uniformly to the lapping tool 5a. Therefore, the amount of lap liquid that drips can be minimized.

Additionally, a vacuum suction type lap liquid collecting device 53 is provided obliquely above the interferometer 21a. The collecting device 53 is positioned a little higher than the interferometer 21a. The collecting device 53 is also positioned a little before the interferometer 21a (toward the upstream side) in the lapping tool rotating direction. The collecting device 53 is positioned so as not to obstruct the measurement of the interferometer 21a or especially not to cause any adverse fluctuation of air in an interference light path of the interferometer 21a. Air is sucked by the collecting device 53 before the interferometer 21a. The lap liquid falling down to the bottom of the lapping tool 5a or the inner peripheral face of each measurement window 9 is also sucked together with air by the collecting device 53. Therefore, since the dropping lap liquid is effectively collected in the position before the interferometer 21a, the lap liquid can be prevented falling to the interferometer 21a.

The constitution of the second embodiment, except the modification accompanying the arrangement change of the lapping tool 5a, is otherwise the same as that of the first embodiment. In the second embodiment, the roller type lap liquid application device 51 is used, and the collecting device 53 is also provided. Thereby, the invention can be easily applied to the general machining device in which the workpieces are laid on the lapping tool.

A spray equipment for spraying a pressurized fluid may be provided instead of the vacuum type lap liquid collecting device. As the pressurized fluid, air, nitrogen, or another suitable gas which exerts no influence on working and measuring may be used. In this case, contrary to the above, the lap liquid is blown off before dropping to the interferometer 21a.

In the first or second embodiment, a single surface of each workpiece 11 is worked by the machining device, but the first or second embodiment can be applied in the same manner to a machining device for working both surfaces of the workpiece 11. Additionally, by applying the first and second embodiments to a dual surface machining device, the flatnesses of opposite machined surfaces can be simultaneously measured by the interferometers positioned above and below. Furthermore, in the first or second embodiment, the lapping tool 5 and the workpieces 11 are horizontally placed. On the other hand, even when the lapping tool 5 and the workpieces 11 are arranged vertically or at proper angles, the first or second embodiment can be applied in the same manner. A third embodiment described below can also be modified in a similar manner.

EMBODIMENT 3

In the first embodiment determination of whether or not the required flatness has been obtained based on the measured flatness. In a device according to a third embodiment of the present invention, the positional relationship of the workpieces and the lapping tool is controlled in such a manner that the flatness becomes closer to the required accuracy, also based on the measurement result. In the third embodiment, the description of the same constitution as that of the first embodiment is omitted.

Figure 9:
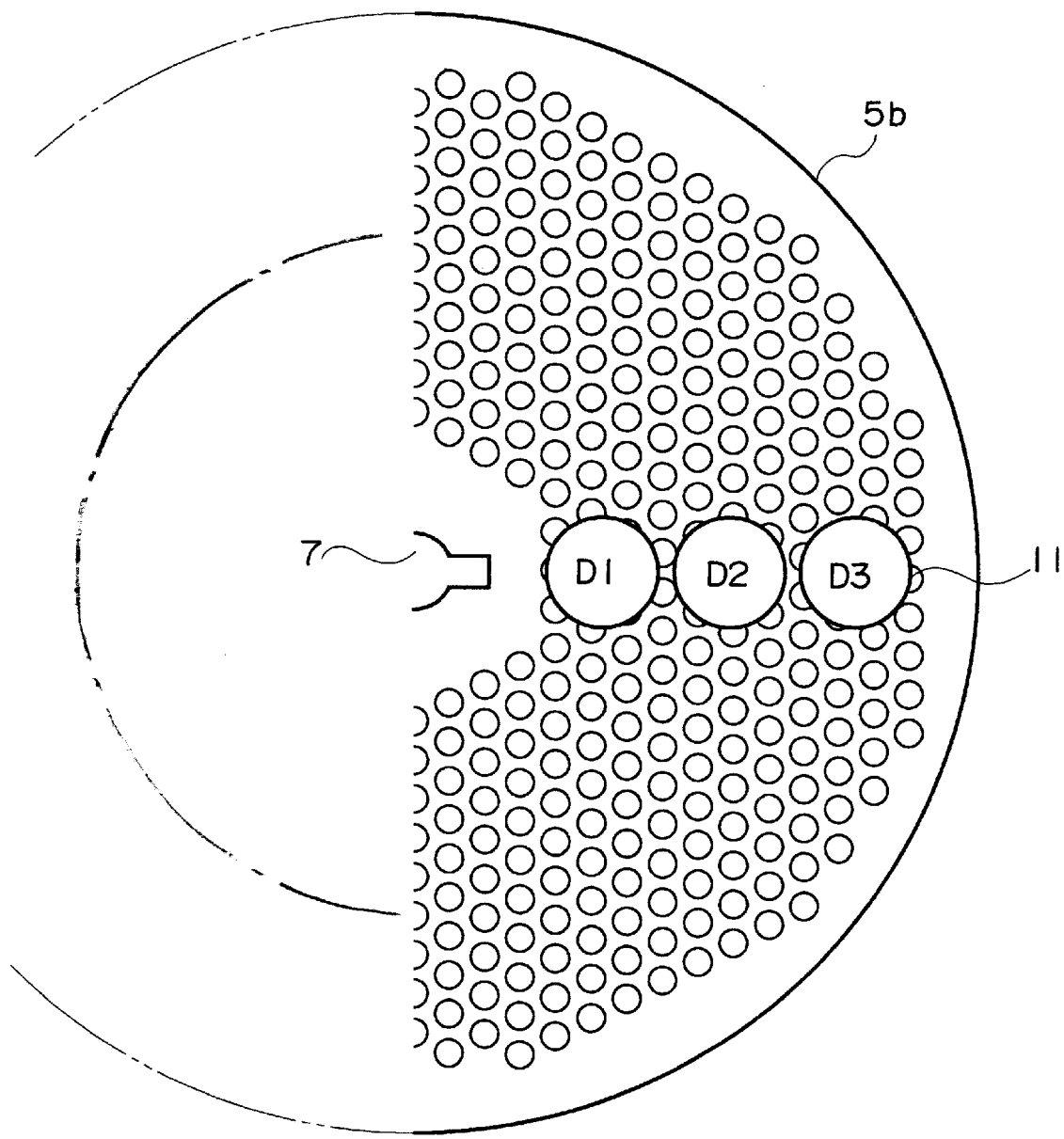
FIG. 9 is a bottom view of a lapping tool of a lapping machine according to a third embodiment of the present invention.

FIG. 9 is a bottom view of a lapping tool 5b in the third embodiment. This lapping tool 5b is larger than the lapping tool 5 of the first embodiment. It is known by experience that a machined flat profile of the workpiece 11 when disposed in a position D1 close to the rotation shaft 7 of the lapping tool 5b differs as follows from a machined flat profile of the workpiece 11 when disposed in a position D3 apart from the rotation shaft 7. Specifically, when the workpiece 11 is close to the rotation axis (D1), the central portion of the workpiece 11 tends to be convex. On the other hand, when the workpiece 11 is apart from the rotation axis (D3), the central portion of the workpiece 11 tends to be concave.

In this embodiment, it is determined during machining whether a machined surface has a concave contour or a convex contour. Furthermore, the distance (offset quantity) of the workpiece 11 from the rotation shaft 7 is regulated in accordance with the judgment result of the concave or convex contour. The lapping is begun in a position D2 of FIG. 9. When machining during it is judged that the machined surface is concave, the workpiece 11 is moved to the position D1. When during machining it is judged that the machined surface is convex, the workpiece 11 is moved to the position D3. In this manner, by checking the flatness during machining and accordingly moving the workpiece 11, a very flat machined surface without irregularities can be obtained. Additionally, instead of selecting the position of the workpiece from the three positions as aforementioned, the position of the workpiece can be freely regulated in accordance with surface irregularities.

Figure 10:
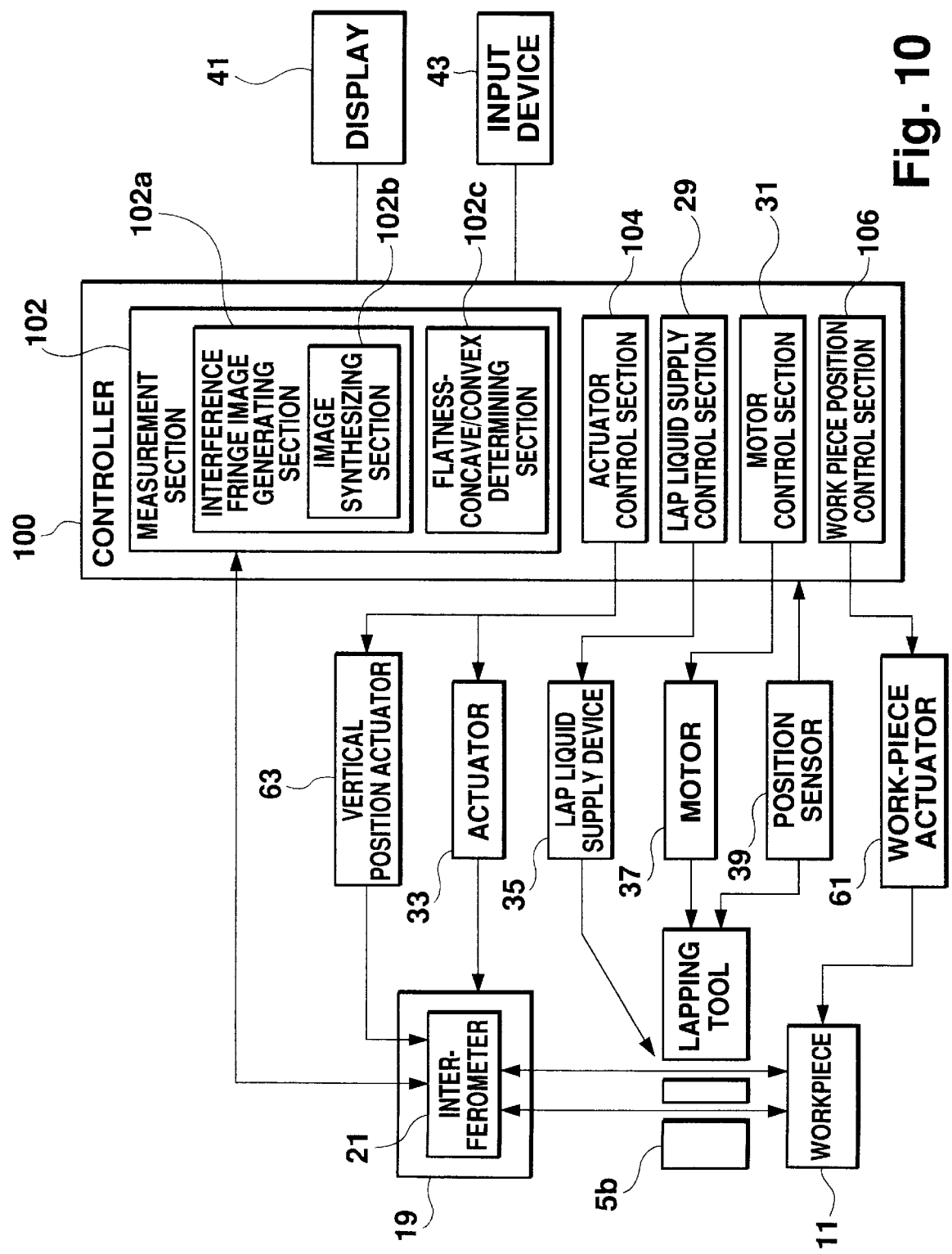
FIG. 10 is a block diagram showing an entire constitution of the lapping machine according to the third embodiment.

FIG. 10 is a block diagram of the machining device according to the third embodiment. Corresponding constituting elements to those of the first embodiment are denoted by the same numerals. In FIG. 10, a workpiece actuator 61 is provided for moving the workpiece 11 in a radial direction of the lapping tool 5b. The workpiece actuator 61 moves the workpiece 11 together with the bearings A, B and the workpiece base 13. The workpiece actuator 61 is controlled by a workpiece position control section 106 of a controller 100. The workpiece position control section 106 operates the workpiece actuator 61 to position the workpiece 11 at an optional distance from the rotation shaft 7 of the lapping tool 5b.

The third embodiment is also provided with a vertical position actuator 63 for vertically moving the interferometer 21 in the unit 19. The vertical position actuator 63 is controlled together with the actuator 33 for moving the interferometer unit 19 in the plane by an actuator control section 104 in the controller 100. The vertical position actuator 63 slightly changes a height of the interferometer 21. Thereby, the interferometer 21 generates an interference image when the distance from the workpiece 11 differs, and transmits the image to the controller 100.

In a measurement section 102 of the controller 100, an interference fringe image generating section 102a and an image synthesizing section 102b correspond to their equivalents in the first embodiment. A flatness-concave/convex determining section 102c determines the flatness in the same manner as in the first embodiment, and also determines whether a machined surface is concave or convex. Interference images obtained at plural heights are entered from the interferometer 21. The number of images necessary for synthesizing process of the image synthesizing section 102b are entered at each height. In the flatness-concave/convex determining section 102c, a movement direction of an interference fringe between the images obtained at different heights by the interferometer 21 is detected, and it is determined based on the movement direction whether the machined surface is concave or convex (fringe scan method). A determination result is transmitted to the workpiece position control section 106 and used to control the position of the workpiece 11.

Operation of the machining device according to the third embodiment will next be described. When work is begun, the workpiece 11 is in the position D2 of FIG. 9 and lapping begins in the same manner as the first embodiment. The flatness and convex/concave of the machined surface are determined at a predetermined timing. The predetermined timing is set, for example, at a time when it is judged, based on the output of the position sensor 39, that the thickness of the workpiece 11 will reach the predetermined value. At this time, an image of interference fringes (synthesized image) is generated in the same manner as the first embodiment while the interferometer 21 is positioned at a certain height. The actuator control section 104 slightly moves the interferometer 21 vertically. Subsequently, an image of interference fringes is generated again. The flatness-concave/convex determining section 102c determines the flatness and concave/convex by using plural images.

When the machined surface of the workpiece 11 has small irregularities, the workpiece 11 is held unchanged in the position D2. When it is judged that the machined surface is concave, the workpiece position control section 106 operates the workpiece actuator 61 to move the workpiece 11 to the position D1. Conversely, when it is judged that the machined surface is convex, the workpiece position control section 106 moves the workpiece 11 to the position D3. The determination of the concave/convex and the position control of the workpiece 11 are independently performed on each workpiece 11.

After the workpiece 11 is moved, the lapping is continued, and the workpiece thickness and flatness are monitored. At proper time intervals, as aforementioned, the concave/convex of the machined surface is detected, and the workpiece position is controlled based on the detection result. When the workpiece thickness and flatness reach target values, the motor control section 31 stops the motor 37, thereby completing the lapping process.

In this embodiment, the workpiece is moved based on the measurement result obtained by using the interferometer, and the positional relationship between the workpiece and the lapping tool is changed. Therefore, even when the machined surface is concave or convex during working, the machined surface can be made substantially flat by reducing irregularities. Consequently, the automatic working with higher accuracy can be realized.

In the above, the preferred embodiment of the invention has been described in which, by passing light emitted by the interferometer through the measurement windows formed in the working tool, the interference fringes on the surface of the workpiece is measured. As a modification of this embodiment, displacement can be detected in a broader range during working by using an optical displacement meter or another optical measuring device.

MEASUREMENT WHILE MACHINED SURFACE IS ROUGH

Figure 11:
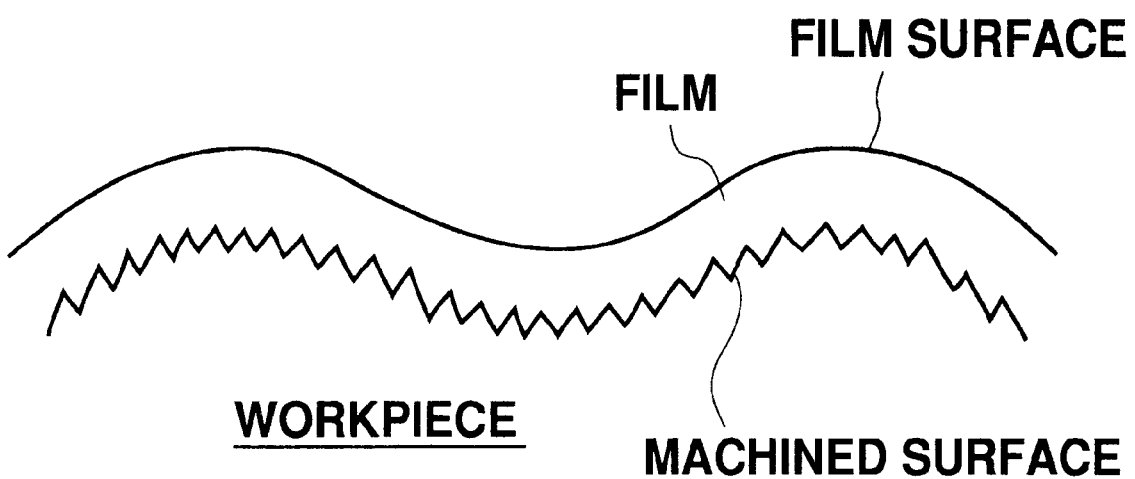
FIG. 11 is an enlarged view of a machined surface of a workpiece showing a liquid film on the machined surface.

The invention can be applied to measurements performed when a machined surface is rough, for example, a case when a surface of the workpiece 11 is satin-like. When the machined surface is rough, interference fringes are generally not formed clearly. In this invention, however, a film of lap liquid is formed on the machined surface as shown in FIG. 11. The lap liquid is constituted by mixing abrasive grains in a liquid mixture of water and alcohol. The thickness of the film is preferably about 0.3 $\mu$m or less, and the surface of the film is smooth. The interference fringes are generated by using light reflected by the surface of the film. The interference fringes indirectly represent the profile of the workpiece. Therefore, with the present invention, the interference fringes can be measured even when the machined surface is rough.

In many cases, the under surface of the lapping tool is formed of a hard material. In order to securely form the film shown in FIG. 11, an application member may be disposed on the under surface of the lapping tool 5. The application member is formed of a material superior in application and wiping properties such as a foam rubber, urethane sponge, urethane resin, or wool cloth. The application member is embedded in the under surface of the lapping tool. The surface of the application member is positioned substantially as high as the under surface of the lapping tool. Plural fan-shaped application members are arranged in a circle at equal intervals. The measurement windows are formed through the application members.

The contact surface of a lapping tool for use in polishing is usually soft. For example, a pad of urethane resin is placed on the lapping tool. In this case, an exclusive application member is unnecessary.

In this embodiment, since the working tool is provided with the application members, a uniform liquid film is automatically formed while a workpiece is worked by the working process, and interference fringes can be advantageously measured. Another advantage is that the lap liquid is used as a measurement liquid for forming the film. When the polishing lapping tool is used, a uniform film can be securely formed in a simple structure of the conventional lapping tool.

EMBODIMENT 4

Figure 12:
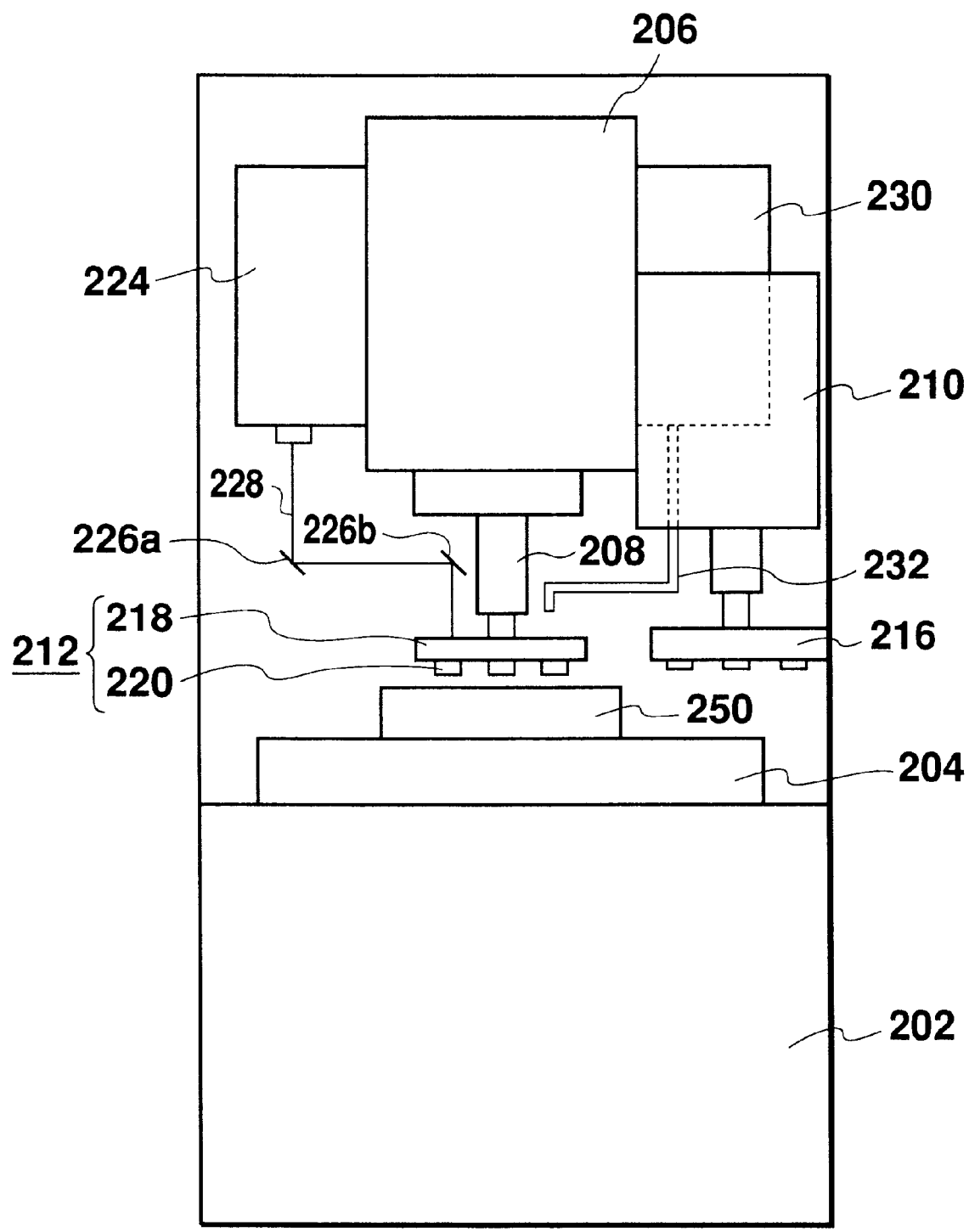
FIG. 12 shows a mill according to a fourth embodiment of the present invention.

FIG. 12 shows a machining device according to a fourth embodiment of the present invention. The machining device is used for milling, and is an example of a general device for cutting, grinding, or the like. In order to enhance machining accuracy, a machined surface profile is measured not only after completing machining, but also during milling. In the conventional art, however, since no clear interference fringe is generated during milling when the machined surface has a large surface roughness, optical interference measurement can not be performed. However, with the machining device of the fourth embodiment of the present invention, interference fringes can be measured even in such a situation.

In FIG. 12, an XY table 204 is laid on a device base 202. The XY table 204 can be moved along a plane by an actuator mechanism (not shown) (X and Y axes are set orthogonal to each other along the plane, while a Z axis is set vertically). A workpiece 250 is clamped and fixed on the XY table 204 by a clamp device (not shown).

Above the XY table 204 a Z-axis head 206 is fixed to the base 202, and supports a Z-axis spindle 208. The Z-axis head 206 has a motor and the actuator mechanism built therein to rotate and move in an Z-axis direction the Z-axis spindle 208. At the time of machining and measuring as described later, the Z-axis spindle 208 is operated and moved downward while rotating.

The Z-axis head 206 is further provided with a tool changer 210. The tool changer 210 changes a tool on a tip end of the Z-axis spindle 208. A measurement jig 212 and a milling tool 216 are changed by the tool changer 210. In the condition of FIG. 12, the measurement jig 212 is attached to the tip end of the Z-axis spindle 208, and the milling tool 216 is held by the tool changer 210. The tool changer 210 detaches the measurement jig 212 to attach the milling tool 216 or to reverse the operation.

Figure 13:
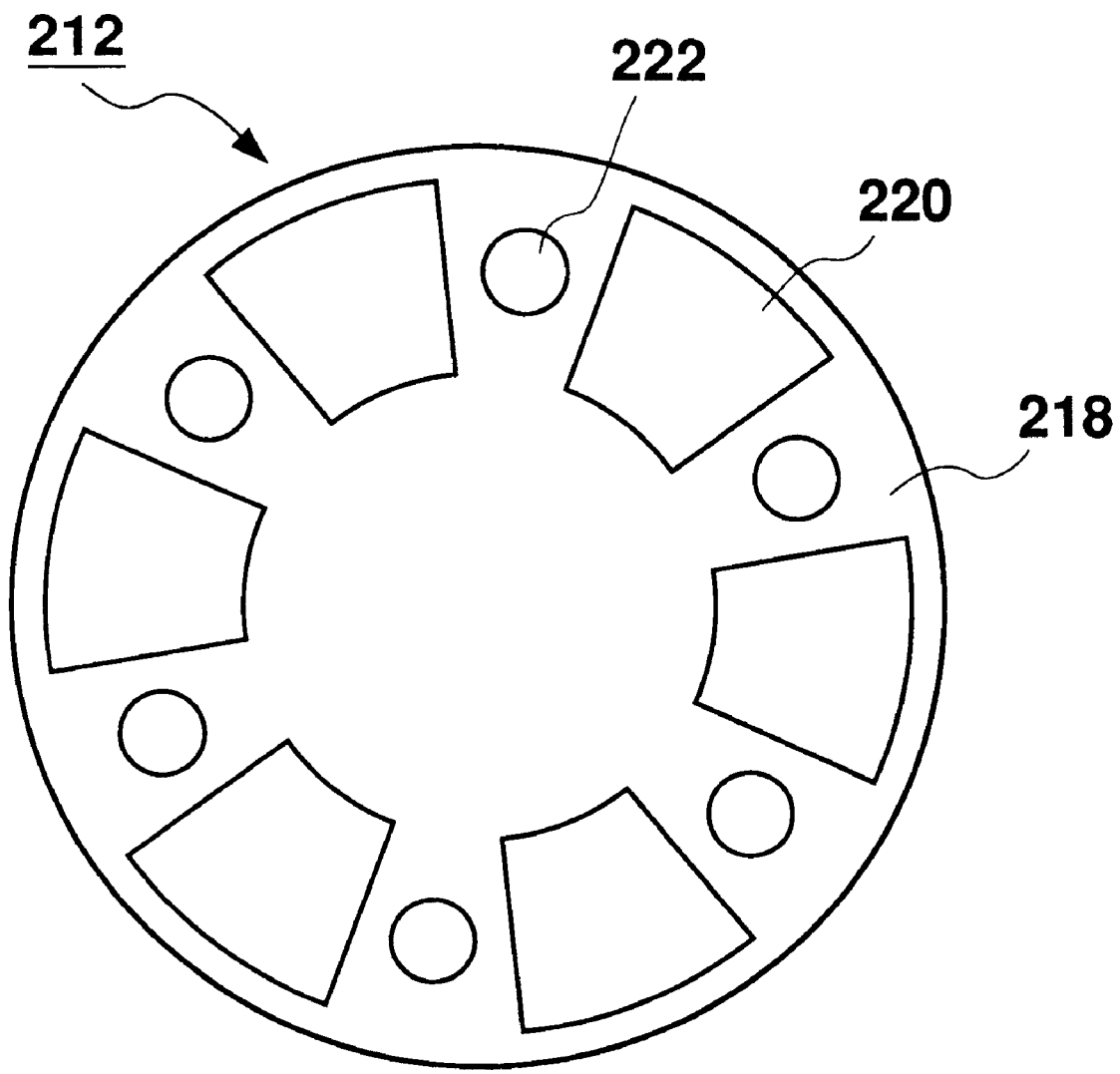
FIG. 13 shows a measurement jig of the mill of FIG. 12.

FIG. 13 is a bottom view of the measurement jig 212. The measurement jig 212 has a disc-shaped measurement jig body 218. When the measurement jig 212 is attached to the Z-axis spindle 208, the measurement jig 212 is disposed in such a manner that a rotation axis of the Z-axis spindle 208 passes through a center of the measurement jig body 218. As shown in FIG. 13, six fan-shaped application members 220 are attached to an under surface of the measurement jig body 218 at equal intervals in a peripheral direction. The application member 220 is a member for applying and spreading measurement liquid (auxiliary liquid) to the workpiece 250. To this end, the application member 220 is formed of a material superior in applying and wiping properties. Specifically, the application member 220 is made of a material with which the measurement liquid is applied to and spread uniformly over the workpiece 250. Therefore, even when workpiece 250 has a rough surface, the measurement liquid is pushed into root portions of a surface roughness curve by the application members 220, so that a uniform film as shown in FIG. 11 is formed on the workpiece 250. The application member 220 is preferably formed of, for example, foam rubber, urethane sponge, urethane resin, or a wool cloth. In the embodiment, foam rubber is used.

As shown in FIG. 13, the measurement jig body 218 is also provided with six measurement windows 222 arranged at equal intervals in the peripheral direction. Each of the six measurement windows 222 is provided in a clearance between the adjoining application members 220 and at an equal distance from the center of the measurement jig body 218. The measurement window 222 is a circular hole formed through the measurement jig body 218.

In FIG. 12, a measurement liquid tank 230 is attached to the device base 202. The measurement liquid is stored in the measurement liquid tank 230. The measurement liquid suitable for the workpiece 250 is used. Usually, oil is most suitable. Because the workpiece surface sheds little oil, and the thickness of the applied film can be made thin.

However, there are materials for which the use of oil is not suitable. For example, for a porous material like ceramic, if oil penetrates the material, cleaning after measurement requires many hours. In this case, water or alcohol is preferably used, though mixture of water and alcohol may be used. When the workpiece is made of resin, however, alcohol cannot be used in some case because the properties of the workpiece surface are changed by the alcohol.

It is further preferable to properly mix the measurement liquid with a surface-active agent. Especially, when only the water is used, the workpiece surface easily sheds water and a thin film cannot be easily formed, and therefore, the surface-active agent is preferably mixed with water. As another measurement liquid, an optional liquid is used singly or in combination. The measurement liquid is selected also by considering the compatibility with a milling liquid.

A measurement liquid supply hose 232 is attached to the measurement liquid tank 230. The measurement liquid tank 230 is also provided with a valve (not shown). When the valve is opened, the measurement liquid is supplied through the measurement liquid supply hose 232 to the measurement jig 212. At this time, the measurement jig body 218 rotates with the Z-axis spindle 208, and the application members 220 abut on the workpiece 250. When the measurement windows 222 pass below a tip end of the measurement liquid supply hose 232, the measurement liquid passes through the measurement windows 222 to reach the workpiece 250. The measurement liquid is applied and spread by the application members 220, and a uniform film as shown in FIG. 11 is formed. For example, the thickness of the film is preferably about 0.3 $\mu$m or less.

An interferometer 224 is further attached to the device base 202. As the interferometer 224, a Fizeau interferometer or another known interferometer may be used. The interferometer 224 emits a parallel light beam downward. The parallel light beam is reflected by mirrors 226a and 226b to reach the measurement jig 212. The mirrors 226a and 226b are arranged in such a manner that the light beam is transmitted through the measurement window 222 of the measurement jig 212 to reach the workpiece 250. Interference measuring is performed when the measurement jig 212 is rotated. The light beam emitted by the interferometer 224 reaches the workpiece 250 when an optical axis 228 is overlapped with the measurement window 222. Subsequently, the light is reflected by the film of measurement liquid on the surface of the workpiece 250 and returns to the interferometer 224. The interferometer 224 uses the reflected light to generate an interference fringe image.

Figure 14:
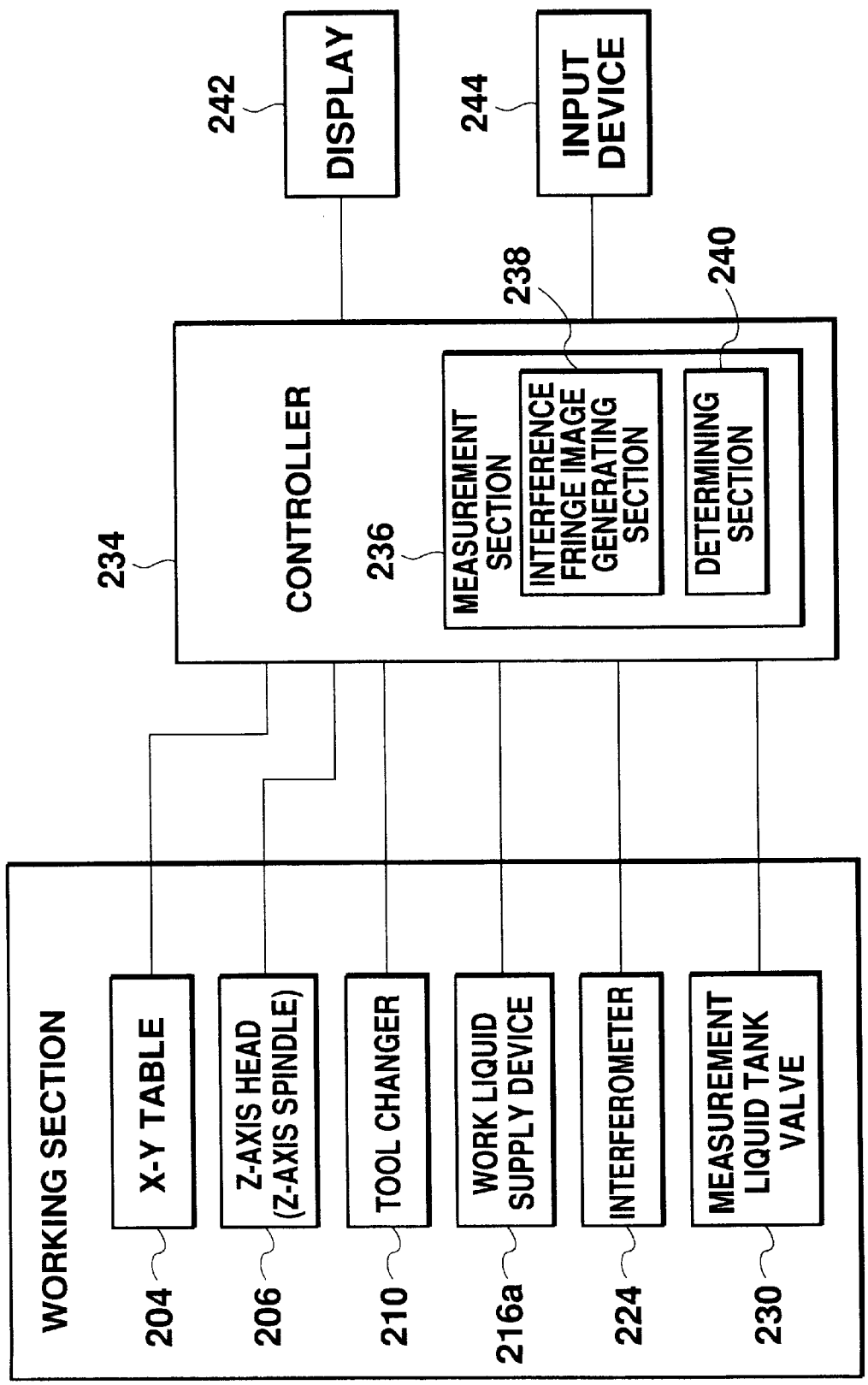
FIG. 14 is a block diagram showing an entire constitution of the mill of FIG. 12.

FIG. 14 is a block diagram showing an entire constitution of the fourth embodiment. As shown in FIG. 14, a controller 234 is provided for controlling the machining device. The controller 234 controls the actuator for moving the XY table 204 to move the XY table 204 together with the workpiece 250. The controller 234 also transmits a control signal to the Z-axis head 206 to control the rotating operation and forwarding operation of the Z-axis spindle 208 (operation, stop, operation speed and the like). Thereby, the measurement jig 212 or the milling tool 216 is rotated and pressed against the workpiece 250, and the rotation speed and the pressed quantity (pressing force) are regulated. The controller 234 also controls the tool changer 210 to change the measurement jig 212 and the milling tool 216. The controller 234 further controls a work liquid supply device 216a to supply the work liquid to the milling tool 216 and the workpiece 250 at the time of working.

Furthermore, the controller 234 switches the valve of the measurement liquid tank 230 to control the supply time and amount of the measurement liquid to the measurement jig 212. The controller 234 also controls the interferometer 224. The interferometer 224 includes a built-in camera, and a photographed image of interference fringes is transmitted to the controller 234. The interference fringe image represents the profile of the workpiece. The controller 234 is provided with a measurement section 236. The measurement section 236 is provided with an interference fringe image generating section 238 and a determining section 240. In the interference fringe image generating section 238, digital data of the interference fringe image is generated based on the output of the interferometer 224. The determining section 240 makes determination of a profile (rugged surface (waviness) or the like) based on the image data of interference fringes. Here, the image data actually represents the profile of the film in FIG. 11. However, since the film is formed uniformly, the profile of the machined surface can be seen indirectly through the measurement of the film.

The controller 234 is also connected to a display 242 as an output device and a keyboard or another input device 244. The image generated by the interference fringe image generating section 238 is displayed on the display 242. With the input device 244, an operator enters instructions, for example, to operate or stop the device. An image plane necessary for the operator to operate is also displayed on the display 242 at a proper time.

Operation of the machining device according to the fourth embodiment will be described. First, an operator fixes the workpiece 250 onto the XY table 204 by using a clamp device. The operator also enters various instructions concerning machining, and the device is instructed to begin machining. The instructions include a work quantity indicating how much the workpiece 250 is worked (corresponding to a total forwarding quantity of the Z-axis spindle 208). The controller 234 controls the XY table 204 to position the workpiece 250 below the Z-axis spindle 208. Moreover, the milling tool 216 is attached to the Z-axis spindle 208 by the tool changer 210. Under the control of the controller 234, the Z-axis spindle 208 is forwarded downward while rotating. The rotation speed and the depth of cut is set to a predetermined initial value.

The depth of cut means a quantity by which the milling tool 216 is pressed onto the workpiece 250. When the tip end of the milling tool 216 just abuts on the workpiece 250, no machining is performed because the milling tool 216 does not bite into the workpiece 250. By pressing to some degree the milling tool 216 onto the workpiece 250 to allow the tool to bite into the workpiece 250, the surface of the workpiece 250 is the cut. At this time, the important quantity is the depth of the cut. When the cut is deep, the machined surface is largely rugged because of vibration generated during working or the like, and the profile is deteriorated. On the other hand, when the depth of the cut is shallow, the required machining time is lengthened. The initial value of the cut depth is set to a large value in a range in which the profile is not deteriorated under standard conditions.

After a while after the start of machining, the controller 234 halts work. The Z-axis spindle 208 stops rotating and moves upward. Machining may be automatically stopped after a predetermined time elapses or after a predetermined quantity is machined (after the Z-axis spindle 208 is moved by a predetermined forwarding quantity). Alternatively, machining may be stopped when the operator enters a stop instruction.

After machining is halted, the controller 234 controls the tool changer 210 to attach the measurement jig 212 to the Z-axis spindle 208. The controller 234 operates to rotate and forward the Z-axis spindle 208 again. The measurement jig 212 moves downward while rotating, stops lowering when the application members 220 are brought in light contact with the workpiece 250 and rotates while maintaining the light contact condition. The controller 234 also opens the valve of the measurement liquid tank 230. A predetermined amount of measurement liquid is supplied through the measurement liquid supply hose 232 to the measurement jig 212, flows through the measurement windows 222 to reach the workpiece 250, and is spread by the application members 220. Thereby, a film of measurement liquid is formed. Additionally, the measurement liquid may be supplied manually by the operator.

The controller 234 further controls the interferometer 224 to photograph an image of interference fringes. Photographing is performed after a predetermined time elapses after the measurement liquid is supplied so that the film thickness of the measurement liquid film becomes constant. The photographed image is entered to the measurement section 236, and digital image data of the interference fringe image is generated in the interference fringe image generating section 238.

Based on the image data, the determining section 240 detects a rugged surface, and determines whether or not the rugged surface is unusually rough by comparing the rugged surface with a reference value. The determining section 240 also checks if the machined surface is unusually deformed, as if the clamp device clamps the workpiece 250 with an excessively strong force or the force is unbalanced in some places, the workpiece 250 may in some cases, be unusually deformed. The determining section 240 further detects stepwise form error (step) existing on the surface of the workpiece 250, and obtains their contours.

When no unusually rugged surface, deformation, or step is detected, the controller 234 controls the tool changer 210 to attach the milling tool 216 to the Z-axis spindle 208 again. On the other hand, when large rugged surfaces, deformed surfaces, or stepwise surface are detected, the controller 234 displays the detection result together with the interference fringe image on the display 242. The operator judges by the display 242 whether or not continuing work would create a problem, and then enters a continuing instruction into the input device 244. If the continuing instruction is entered, the controller 234 attaches the milling tool 216 to the Z-axis spindle 208. Additionally, even when no unusual surface is detected, in response to the operator's instruction, the interference fringe image or the detected value of the rugged surface or the like is displayed on the display 242 at an appropriate point. The operator can make visual determination by observing the interference fringes.

Subsequently, milling is resumed by the control of the controller 234. At this time, the controller 234 regulates the depth of cut based on the rugged surface detected by the determining section 240. When the rugged surface is relatively rough, the depth of cut is shifted from the initial value toward a shallower value. When the rugged surface is smooth, the depth of cut is shifted toward a deeper value, and the working speed is accelerated. The roughness of the rugged surface is judged by comparing the rugged surface with a standard value during working. The controller 234 finishes working when the workpiece is worked by the work quantity first entered by the operator. The Z-axis spindle 208 is withdrawn and stopped.

In the working operation, working may be stopped plural times to perform measurement. Furthermore, after working is stopped once, measurement may be preferably performed plural times to enhance the measurement accuracy. Alternatively, instead of the depth of cut, the rotation speed, the forwarding speed or the like may be regulated. Among these parameters plural parameters may be regulated.

DEVICE RELATING TO EMBODIMENT 4

An optical interference measurement device includes an auxiliary liquid supply means for supplying an auxiliary liquid for measurement (measurement liquid) and an auxiliary liquid application means for applying the auxiliary liquid to a workpiece to form a film having a uniform thickness on a workpiece surface. As shown in FIG. 11, the film has a certain averaging effect relative to a surface roughness, and a film surface is smooth even when the workpiece surface is rough. Optical interference measuring is performed on the film surface, and an interference fringe image is obtained. Interference fringes of the film indirectly represent a profile of the workpiece. By measuring the interference fringes on the film surface, the workpiece profile can be indirectly obtained. The measurement can be performed before working is completed, and the accuracy of work can be enhanced by using measurement results.

The liquid application means has a body member, an application member and a measurement window. Measurement can be performed in a simple constitution while the liquid is applied and spread, and therefore, a highly accurate measurement is realized.

The measurement device is integrally mounted on the machining device, and measuring is performed while the workpiece is supported by the machining device. An arrangement changing operation of detaching the workpiece from the machining device to set it to another measurement device is unnecessary. During machining it can be determined based on the measurement results whether or not machining conditions are appropriate. Subsequently, by regulating machining conditions or the like, precision can be enhanced, and defects can be prevented. Furthermore, it can be seen through the measurement whether or not the clamped condition of the workpiece is unusual. If the clamping force is excessively strong or unbalanced, it appears on the profile as the deformation of the workpiece. By detecting an unusual clamping, precision of is enhanced, and defects can be prevented. Moreover, since the arrangement changing operation of the workpiece is unnecessary, the time can be shortened.

Furthermore, the machining conditions of the workpiece can be automatically regulated based on the measurement results. Therefore, by correcting a dispersion in skills of machine operators or an influence of fluctuations in environmental conditions, a highly accurate machining can be performed.

Furthermore, in the machining device, the machine tool and the measurement jig can be changed by the tool changer. The tool changer is an aspect of a working/measuring switching means, and switches from the working by means of the working tool to the measuring by the optical interference measurement device. During cutting, grinding, or other general machining operation, a large amount of liquid is used, and much cut powder is produced. Therefore, it is difficult to form a measurement film as shown in FIG. 11 while the workpiece is worked by the working tool. However, by using the tool changer, machining and measurement can be alternated. As the tool changer, a known changer attached to an NC machine may be used.

What is claimed is:

1. An optical interference measurement device for optically measuring an interference fringe of a workpiece having a first side and an opposite second side, comprising:

a work table having the workpiece disposed thereon so that the second side of the workpiece is in contact with a surface of the work table;

a machine tool disposed on the first side of the workpiece the machine tool having a measurement window, through which a measurement light is passed to irradiate the first side of the workpiece, the first side being a machined surface of the workpiece; and an interferometer for optically detecting the interference fringe through said measurement window from the side of the machine tool opposite to the workpiece.

2. The optical interference measurement device according to claim 1 further comprising:

an image generating device for generating an interference fringe image indicating the interference fringe; and an image processor for obtaining an image in which the interference fringe is continuous in an area broader than that of the measurement window based on plural interference fringe images when a positional relationship between the machine tool and the workpiece differs.

3. The optical interference measurement device according to claim 1 further comprising:

a suction device provided on the side of the interferometer relative to the working tool for removing a work liquid to suppress the influence of the work liquid on the interferometer's measurements.

4. The optical interference measurement device according to claim 1 further comprising:

a fluid spraying device provided on the interferometer side of the machine tool for discharging a pressurized fluid to remove a work liquid and suppress the influence of the work liquid on the interferometer's measurements.

5. A machining device comprising:

a work table:

a workpiece disposed on a surface of the work table, the work piece having a first side and an opposing second side;

a machine tool provided for machining the first side of the workpiece, the machine tool having a measurement window through which a measurement light is passed to irradiate the first side of the workpiece, the first side of the workpiece being a machined surface; and an interferometer for optically detecting an interference fringe through said measurement window from the side of the machine tool opposite to the workpiece.

6. The machining device according to claim 5 wherein said machine tool is disposed on a top surface of the workpiece.

7. The machining device according to claim 6 wherein a work liquid is supplied to the machined surface through said measurement window.

8. The machining device according to claim 7 wherein, after the work liquid is supplied and a film thickness of the work liquid is stabilized, measuring is performed using the interferometer.

9. The machining device according to claim 5 further comprises:
    a working drive device for moving at least one of the machine tool and the workpiece to machine the workpiece; and
    controller for calculating a profile of the machined surface of the workpiece based on an output of said interferometer to control said working drive device based on the calculated profile.

10. The machining device according to claim 9 further comprises:
    an arrangement change device for changing a relative arrangement of the workpiece and the working tool along a direction basically perpendicular orthogonal to a direction in which the workpiece and the working tool are relatively moved by said working drive device, wherein, by controlling said relative arrangement in accordance with the profile of the workpiece, the profile of the workpiece is regulated.

11. The machining tool according to claim 5, further comprising:
    a device for generating an interference fringe image indicating the interference fringe; and
    an image processor for obtaining an image in which the interference fringe is continuous in an area broader than that of the measurement window based on plural interference fringe images when a positional relationship between the machine tool and the workpiece differs.

12. A machining device for machining a workpiece having a first side and an opposite second side, comprising:
    a work table for receiving the workpiece;
    a machine tool rotatable relative to the workpiece, the machine tool being disposed on the first side of the workpiece, the machine tool having a measurement window through which a measurement light is passed to irradiate the first side of the workpiece, the first side being a machined surface;
    an interferometer for optically detecting an interference fringe through said measurement window from the side of the machine tool opposite to the workpiece; and
    a controller for controlling the machining device, said controller comprising a concave/convex detecting section for detecting a concave/convex condition of the workpiece based on an output of said interferometer, and regulating the convexity/concavity of the machined surface by controlling an offset quantity in arrangement of the workpiece from a rotation axis of a machine tool based on the detected concave/convex condition.

13. The machining device according to claim 12 wherein said controller detects the concave/convex condition of the machined surface based on an output of the interferometer when a distance between the interferometer and the machined surface differs.

14. The optical interference measurement device according to claim 1 wherein
    the machining by said machine tool is an abrasive machining in which an abrasive is interposed between the machine tool and the workpiece.

15. The machining device according to claim 5 wherein
    the machining by said machine tool is an abrasive machining in which an abrasive is interposed between the machine tool and the workpiece.

* * * * *